United States Patent
Laurant et al.

(10) Patent No.: US 9,410,485 B2
(45) Date of Patent: Aug. 9, 2016

(54) COMPOSITE PANEL HAVING A BUILT-IN DUCT

(71) Applicant: AIRCELLE, Gonfreville l'Orcher (FR)

(72) Inventors: Franck Laurant, St Romain de Colbosc (FR); Francois Bellet, St Wandrille Rancon (FR); Jean-Philippe Joret, Beuzeville (FR)

(73) Assignee: AIRCELLE, Gonfreville L'Orcher ( * ) Notice: Subject to any disclaimer, the term of this patent is extended or adjusted under 35 U.S.C. 154(b) by 8 days.

(21) Appl. No.: 14/272,884

(22) Filed: May 8, 2014

(65) Prior Publication Data

US 2014/0286764 A1 Sep. 25, 2014

Related U.S. Application Data

(63) Continuation of application No. PCT/FR2012/052484, filed on Oct. 29, 2012.

(30) Foreign Application Priority Data

Nov. 10, 2011 (FR) ...................... 11 60243

(51) Int. Cl.
| | |
|---|---|
| *B32B 3/24* | (2006.01) |
| *B64D 33/02* | (2006.01) |
| *B64D 29/00* | (2006.01) |
| *B64C 7/02* | (2006.01) |

(Continued)

(52) U.S. Cl.
CPC ... *F02C 7/20* (2013.01); *B64C 7/02* (2013.01); *B64D 33/08* (2013.01); *F01D 25/24* (2013.01); *F02C 7/04* (2013.01); *B29L 2031/3076* (2013.01); *B29L 2031/7504* (2013.01); *B32B 3/266* (2013.01); *B32B 2250/03* (2013.01); *B32B 2250/40* (2013.01); *B32B 2605/18* (2013.01); *B64D 29/00* (2013.01); *B64D 2241/00* (2013.01); *F02C 6/08* (2013.01); *F05D 2240/14* (2013.01); *F05D 2270/09* (2013.01); *F05D 2300/603* (2013.01); *Y02T 50/672* (2013.01); *Y10T 428/24182* (2015.01); *Y10T 428/24281* (2015.01); *Y10T 428/24322* (2015.01); *Y10T 428/24612* (2015.01)

(58) Field of Classification Search
None
See application file for complete search history.

(56) References Cited

U.S. PATENT DOCUMENTS 1,608,727 A * 11/1926 Dickey ...................... B26F 1/24
156/222
2,699,906 A * 1/1955 Lee .......................... F02C 7/042
244/53 B (Continued)

FOREIGN PATENT DOCUMENTS

| | | | | |
|---|---|---|---|---|
| CN | 101994570 A | * | 3/2011 | |
| DE | 19904986 A1 | * | 8/2000 | ............ B29C 44/569 |

(Continued)

OTHER PUBLICATIONS

International Search Report issued Feb. 12, 2013 in International Application No. PCT/FR2012/052484.

*Primary Examiner* — Jeff Vonch
(74) *Attorney, Agent, or Firm* — Burris Law, PLLC

(57) ABSTRACT

A composite panel includes an inner skin and an outer skin and has an opening for receiving a sampling scoop, which forms a channel and the sampling opening of which is in communication with the outer skin. In particular, the outer skin is shaped such that, at the opening, same forms at least a portion of a flow surface of the sampling scoop.

8 Claims, 3 Drawing Sheets

(51) Int. Cl.
  *B64C 1/00* (2006.01)
  *F02C 7/20* (2006.01)
  *B64D 33/08* (2006.01)
  *F02C 7/04* (2006.01)
  *F01D 25/24* (2006.01)
  *B29L 31/00* (2006.01)
  *B29L 31/30* (2006.01)
  *B32B 3/26* (2006.01)
  *F02C 6/08* (2006.01)

(56) References Cited

U.S. PATENT DOCUMENTS

| | | | | |
|---|---|---|---|---|
| 2,721,715 A * | 10/1955 | Hoadley | F02C 7/04 | 137/15.1 |
| 2,810,534 A * | 10/1957 | Fandeux | F02C 7/042 | 244/58 |
| 3,578,526 A * | 5/1971 | Harding | B64C 1/06 | 156/197 |
| 3,840,926 A * | 10/1974 | Stoeberl | B63B 5/24 | 114/357 |
| 3,910,375 A * | 10/1975 | Hache | F02K 1/383 | 181/215 |
| 4,121,606 A * | 10/1978 | Holland | B64D 33/02 | 137/15.1 |
| 4,132,240 A * | 1/1979 | Frantz | B64D 33/02 | 137/15.1 |
| 4,378,097 A * | 3/1983 | Ferguson | B64D 33/02 | 137/15.1 |
| 4,418,879 A * | 12/1983 | Vanderleest | B64D 33/02 | 137/15.1 |
| 4,463,552 A * | 8/1984 | Monhardt | F01D 25/32 | 60/226.1 |
| 4,738,416 A * | 4/1988 | Birbragher | B64D 15/04 | 244/134 B |
| 4,782,658 A * | 11/1988 | Perry | F02C 7/047 | 60/226.1 |
| 4,826,106 A * | 5/1989 | Anderson | B29D 24/007 | 181/214 |
| 4,838,603 A * | 6/1989 | Masoero | B60Q 1/0005 | 296/180.1 |
| 4,993,663 A * | 2/1991 | Lahti | B64C 21/06 | 244/130 |
| 5,049,342 A * | 9/1991 | Scanlon | B29C 45/14467 | 264/250 |
| 5,083,426 A * | 1/1992 | Layland | F02K 1/78 | 428/116 |
| 5,116,251 A * | 5/1992 | Bichler | B64D 33/02 | 137/15.1 |
| 5,269,135 A * | 12/1993 | Vermejan | F02C 7/04 | 60/226.1 |
| 5,279,109 A * | 1/1994 | Liu | F02C 7/052 | 60/39.092 |
| 5,654,060 A * | 8/1997 | Holman | B32B 5/22 | 112/420 |
| 5,706,648 A * | 1/1998 | Porte | F02K 1/805 | 244/54 |
| 6,050,527 A * | 4/2000 | Hebert | B64C 23/00 | 137/15.1 |
| 6,129,311 A * | 10/2000 | Welch | B29C 70/342 | 239/265.31 |
| 6,179,943 B1 * | 1/2001 | Welch | B29C 70/08 | 156/160 |
| 7,200,999 B2 * | 4/2007 | Bagnall | B64C 21/06 | 60/226.1 |
| 7,370,467 B2 * | 5/2008 | Eleftheriou | F01D 5/22 | 60/226.1 |
| 7,588,212 B2 * | 9/2009 | Moe | B64D 15/12 | 244/134 D |
| 7,798,285 B2 * | 9/2010 | Chiou | B64D 33/02 | 181/204 |
| 7,798,873 B1 * | 9/2010 | Dai | B63H 11/103 | 440/38 |
| 7,967,105 B2 * | 6/2011 | Tuan | B64D 33/02 | 181/210 |
| 8,128,037 B2 * | 3/2012 | Powell | B64C 21/08 | 244/130 |
| 8,197,191 B2 * | 6/2012 | Binks | B64D 29/08 | 415/119 |
| 8,572,984 B2 * | 11/2013 | Sheaf | B64C 1/1453 | 60/39.08 |
| 8,726,673 B2 * | 5/2014 | Peters | F02C 6/08 | 137/15.1 |
| 8,839,805 B2 * | 9/2014 | Zysman | B64D 33/02 | 137/15.1 |
| 8,858,163 B2 * | 10/2014 | Hussain | F02C 6/06 | 415/116 |
| 8,876,467 B2 * | 11/2014 | Riou | B64D 33/02 | 415/119 |
| 8,899,512 B2 * | 12/2014 | Vauchel | B64D 33/02 | 244/1 N |
| 9,168,716 B2 * | 10/2015 | Benedetti | B32B 15/01 | |
| 9,194,330 B2 * | 11/2015 | Wood | F02K 3/075 | |
| 9,200,570 B2 * | 12/2015 | Alecu | F02K 3/115 | |
| 2008/0112796 A1 * | 5/2008 | Coney | F02K 1/386 | 415/115 |
| 2008/0128557 A1 * | 6/2008 | Acheson | B64C 1/1453 | 244/135 R |
| 2009/0094989 A1 * | 4/2009 | Kraft | F02K 3/06 | 60/785 |
| 2009/0175718 A1 * | 7/2009 | Diaz | F01D 25/12 | 415/180 |
| 2009/0297342 A1 * | 12/2009 | Laborie | F01D 9/06 | 415/177 |
| 2010/0206994 A1 * | 8/2010 | Barber | B29C 70/205 | 244/53 R |
| 2011/0265490 A1 * | 11/2011 | Klasing | F02C 9/18 | 60/785 |
| 2011/0285096 A1 * | 11/2011 | Bunel | F16L 27/108 | 277/634 |
| 2013/0075539 A1 * | 3/2013 | Seger | B29C 70/865 | 244/53 B |
| 2013/0266448 A1 * | 10/2013 | Blin | B64D 29/00 | 416/219 R |
| 2013/0291553 A1 * | 11/2013 | Leland | B64D 33/02 | 60/782 |

FOREIGN PATENT DOCUMENTS

| | | | | |
|---|---|---|---|---|
| EP | 2 226 473 A2 | | 9/2010 | |
| FR | 2 879 564 A1 | | 6/2006 | |
| FR | 2 915 461 A1 | | 10/2008 | |
| FR | 2936776 A1 | * | 4/2010 | B64D 33/02 |
| JP | 57173126 A | * | 10/1982 | |
| WO | WO 02/28709 A1 | * | 4/2002 | |

* cited by examiner

COMPOSITE PANEL HAVING A BUILT-IN DUCT

CROSS-REFERENCE TO RELATED APPLICATIONS

This application is a continuation of International Application No. PCT/FR2012/052484, filed on Oct. 29, 2012, which claims the benefit of FR 11/60243, filed on Nov. 10, 2011. The disclosures of the above applications are incorporated herein by reference.

FIELD

The present disclosure relates to a scoop for a turbojet engine nacelle integrated into a composite panel.

BACKGROUND

The statements in this section merely provide background information related to the present disclosure and may not constitute prior art.

An aircraft is powered by several turbojet engines each accommodated in a nacelle. Each nacelle also houses a set of auxiliary devices associated with the operation thereof and providing various functions when the turbojet engine is operating or stopped.

A nacelle generally has a tubular structure comprising an air inlet in front of a turbojet engine, a middle section intended to surround a turbojet fan, a rear section which may optionally include thrust reversing means and which is intended to surround the combustion chamber of the turbojet engine, and an exhaust nozzle, the outlet of which is located downstream of the turbojet engine.

Modern nacelles are often intended to house a dual-flow turbojet engine capable of generating, by means of the rotating fan blades, a flow of hot air (also called primary flow) from the combustion chamber of the turbojet engine.

A nacelle typically has an outer fixed structure called Outer Fixed Structure (OFS), which defines with a concentric inner fixed structure, called Inner Fixed Structure (IFS), including a cowl surrounding the structure of the turbojet engine itself behind the fan, an annular flow channel, also called vein, to channel a cold airflow, also called secondary flow, which circulates outside the turbojet engine.

The primary and secondary flows are ejected from the turbojet engine at the rear of the nacelle.

Each airplane propulsion set is thus formed by a nacelle and a turbojet engine, and is suspended to a fixed structure of the airplane, for example under a wing or on the fuselage, by means of a pylon or a mast fastened to the turbojet engine of the nacelle.

The rear section of the outer structure of the nacelle is commonly formed by two substantially semi-cylindrical cowls, on either side of a vertical longitudinal plane of symmetry of the nacelle, and movably mounted so as to extend between an operating position and a maintenance position which gives access to the turbojet engine.

The same applies to the middle section which is adapted to open to allow access to the fan.

It should therefore be noted that an airplane propulsion set integrates functional subsets which have relative movements and between which sealing should be handled.

More particularly, it should be noted that the rear and middle sections comprising subsets respectively used as a casing to the nozzle and a casing to the fan, the propulsion set areas playing an important role in flow generation and orientation.

In order to feed the airplane air distribution circuits (air conditioning, cabin pressurization, etc.) air is sampled at the turbojet engine compressor. This air is of course too hot and must be cooled. It is in particular cooled by a pre-cooling device ("pre-cooler") using cold air sampled by a scoop called pre-cooler scoop.

On the other hand, the nacelle subsets are subjected to temperatures which make them expand and cause deformations, especially radial deformations.

Thus, while the interval between the fan casing and the blades of said fan must be controlled to ensure optimal efficiency of the fan, a radial expansion of the casing may result in an increase in this interval and consequently in a decrease of fan performances since more uncompressed air will escape through this clearance.

In order to overcome this drawback, the fan carter is equipped with a cold air distribution circuit to its surface called TCC "Turbine Clearance Control". This cold air is usually sampled by a scoop located in a cold flow circulation area (vein area) called TCC scoop.

This principle also applies to other parts of the nacelle, such as the nozzle for example.

The sampling scoop is thus generally intended to ensure conveying of the air sampled to the cooling circuit.

To this end, the scoop has the form of a substantially tubular duct having a profiled sampling opening allowing to limit aerodynamic disturbances induced by the sampling.

It is inserted through a wall exposed to the cold airflow, the air sampling opening thereof leading into the circulation area of the sampled airflow. It may especially be an IFS outer panel oriented toward the circulation vein of the secondary flow.

In the case of a panel made from a metal alloy, the scoop is generally introduced into a cutout and has at its sampling opening a peripheral flange intended to ensure the aerodynamic continuity with the panel surface and the fastening of the scoop to this panel by riveting or welding.

The widespread use of composite materials in the manufacture of nacelle panels poses a major challenge to the setting of these scoops.

Indeed, at present, the structure of the scoop must be added on the panel in the same manner as for a metal alloy panel, namely by making a panel cutout substantially in the form of the scoop.

However, it is generally not advisable to make composite panel cutouts, such cutouts causing breaks in the fibers and the inner structure of the composite panel (core), which is likely to affect its integrity and mechanical resistance.

The presence of fixing means, passing through, even partially, the structure of the composite panel, is also undesirable for the same reasons.

SUMMARY

The present disclosure provides a composite panel comprising at least an inner skin and an outer skin, and having at least a port intended to receive a sampling scoop forming a duct, a sampling port of which leads into the outer skin, characterized in that said outer skin is shaped to form at the port at least a portion of a flow surface of the sampling scoop.

Thus, by making a portion of the flow surface of the sampling scoop directly from the composite panel itself, and more specifically by forming the outer skin thereof according to a suitable profile, a better integration of said scoop with such a composite panel is obtained. It is thus possible to limit cutouts and, as a result, damages to the structural integrity of the composite panel.

This also helps provide improved aerodynamic continuity by limiting clearances and gaps between the panel structure and the scoop.

It should be noted that, although the present disclosure is introduced with reference to pre-cooler scoops and TCC, it is not limited therein and is likely to involve any type of air sampling scoops, especially scoops to be inserted through a composite panel such as an IFS panel.

Advantageously, the outer skin forming the flow surface of the scoop is formed by pressing and bending the outer skin in the thickness toward the inside of the panel.

The complementary portion may be added and fixed by any means (gluing, riveting, etc.) and made from any suitable material.

In one form, the outer skin is curved over at least the panel thickness.

According to another form, the flow surface formed by the outer skin extends over the entire periphery of the port intended for the sampling scoop. Thus, the sampling port of the scoop is entirely formed from the panel itself, which provides improved flow and integration.

Advantageously, the sampling scoop is entirely formed from the outer skin and, where appropriate, the inner skin. It may in particular be the case when the portion of the scoop made from the composite panel exceeds the thickness of said panel. The inner skin will then provide the outer perimeter of scoop portion, the outer skin providing the inner perimeter of the formed duct.

According to one form, the panel comprises at least one core disposed between the inner skin and the outer skin.

In another form, the port intended for the sampling scoop is located in an area of said panel comprising the core, called sandwich area.

When the composite panel does not comprise any core at all, the port intended for the sampling scoop may be located in an area of said panel which does not comprise any core, called monolithic area.

The present disclosure also relates to a composite panel comprising a sampling scoop, characterized in that the composite panel is a panel according to the present disclosure.

Advantageously, the sampling scoop comprises a fixing border added to the inner skin of said panel.

Such panels may in particular be panels of the inner structure of a turbojet engine nacelle intended to surround the combustion chamber of said turbojet engine.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
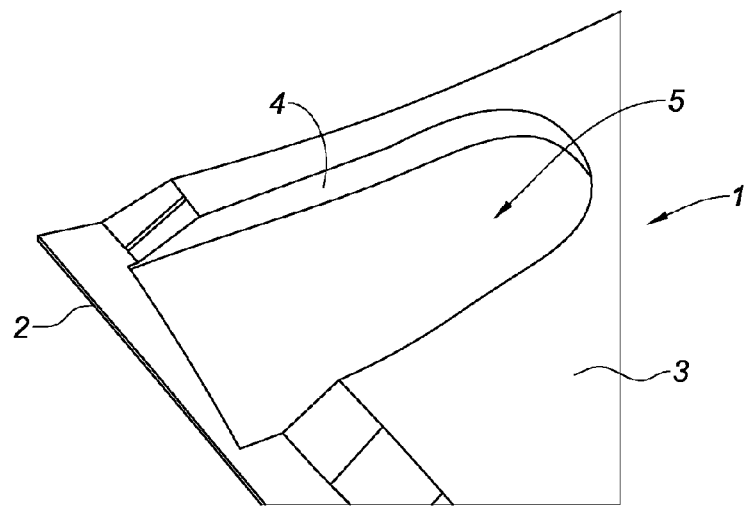
FIG. 1 is a schematic representation of a composite panel provided for receiving a sampling scoop and prepared according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As shown in FIG. 1, a composite panel 1 conventionally comprises an outer skin 2 and an inner skin 3 and optionally a core 4.

The portions of the panel 1 comprising the core 4 are called sandwich area. The portions of the panel 1 not comprising a core are called monolithic area. These are usually the terminal portions and edges of the panel 1.

This composite panel 1 has a port 5 intended to receive an air sampling scoop (not shown) forming a duct, a sampling port of which leads into the outer skin.

According to the prior art and current practice, said port is made by a simple cutout of panel 1 causing the aforementioned drawbacks: an exposure of the core 4 in the sandwich areas, a break in the structure of the outer skin 2 and the inner skin 3 and more generally a break in the integrity of the composite panel, gaps and clearances in the adjustment of the scoop on the panel, fixations inducing aerodynamic disturbances.

To overcome these drawbacks and in accordance with the present disclosure, the composite panel will be made by shaping the outer skin so that it forms at the port at least a portion of a flow surface of the sampling scoop.

FIGS. 2 to 7 show various forms of composite panels for a scoop according to the present disclosure.

Figure 2:
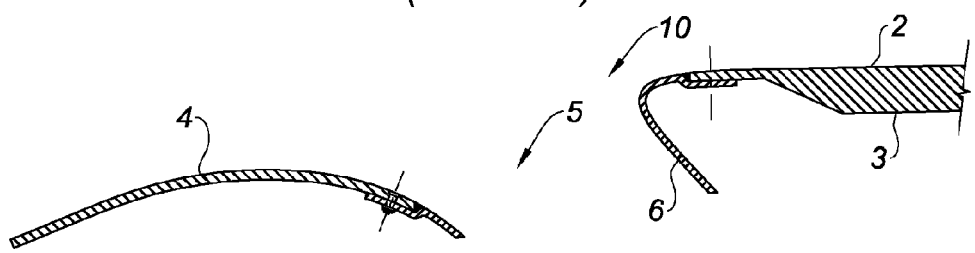
FIG. 2 is a cross-sectional schematic representation of a composite panel according to the present disclosure provided for receiving a sampling scoop in a monolithic area of said panel.

FIG. 2 is a cross-sectional view of a composite panel 10 having a port 5 for the sampling scoop located in a monolithic area. Specifically, the port 5 is delimited by a peripheral flange formed from the inner skin 3 and outer skin 2 in the core 4 of the sandwich area.

According to the present disclosure, this peripheral flange, and hence the corresponding outer skin, is shaped to form at an upstream area of the panel 10 intended to be oriented upstream of the flow of the air to be sampled, a flow surface toward the port 5 receiving the scoop. This flow surface therefore forms a portion of the scoop flow surface.

The remaining structure 7 of the scoop may be added in the port 5 on the panel 10 and fixed downstream of the port with a collar 6 which will be maintained by plunging on the flange of the port 10.

This collar is, of course, only one example of a possible fixation and any fixing mode known to those skilled in the art may be considered (riveting, bolting, gluing, etc.).

Thus, the scoop is partially integrated into the composite panel and air sampling is improved.

Figure 3:
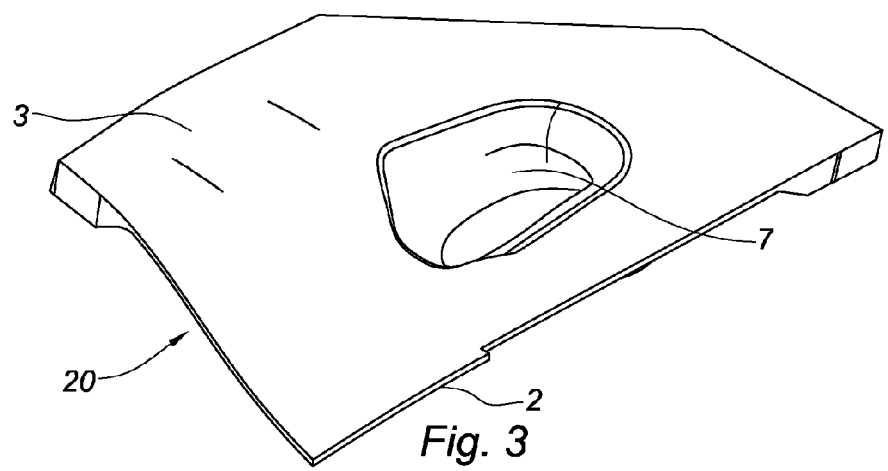
FIG. 3 is a top view schematic representation of a composite panel according to the present disclosure comprising a sampling scoop installed in a sandwich area of said panel.
Figure 4:
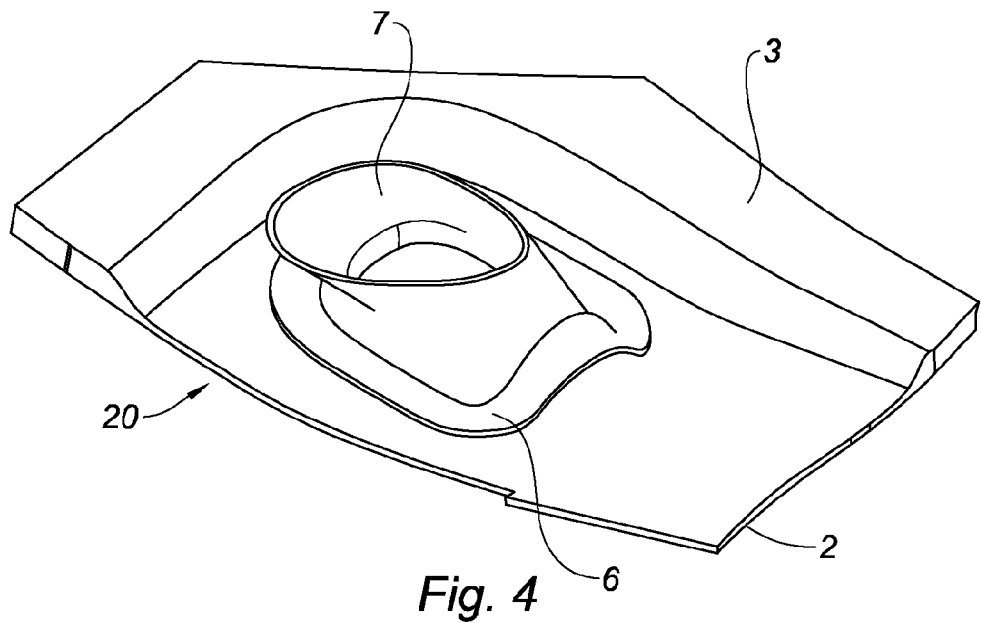
FIG. 4 is a bottom view schematic representation corresponding to FIG. 3.

FIGS. 3 and 4 show a composite panel 20 similar to the panel in FIG. 2 except that the port 5 of the scoop 7 is located in a core 4 sandwich area. FIG. 3 shows the outer skin 3 curved to plunge into the thickness of the panel 20 thereby providing aerodynamic continuity with the sampling duct formed by the scoop 7.

Figure 5:
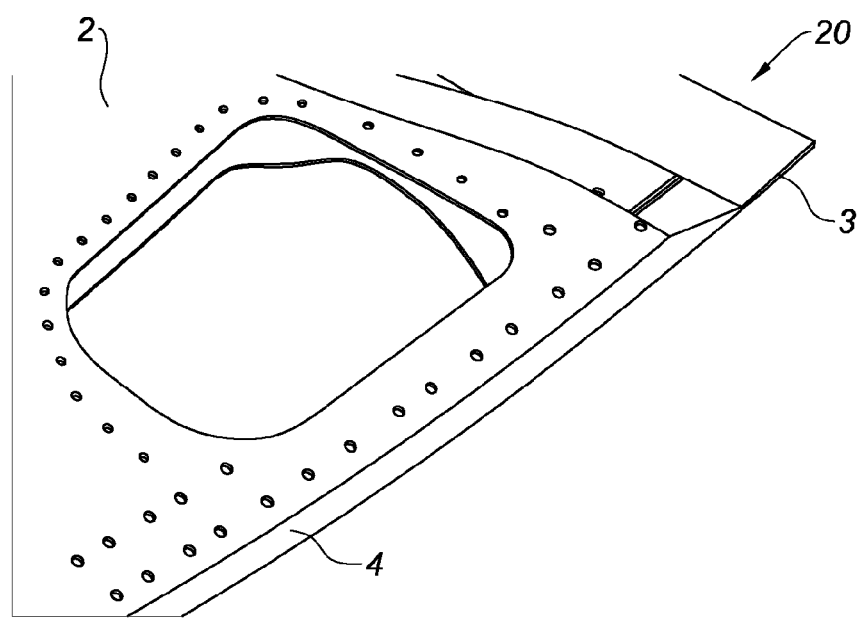
FIG. 5 is a bottom view schematic representation corresponding to FIG. 4 without the sampling scoop portion.

FIG. 5 corresponds to the form of FIGS. 3 and 4 without the scoop 7 structure inserted into the panel. We will notice that the reduced thickness decreases between the outer skin 2 and the inner skin 3 at an upstream area of the port intended to be oriented in the direction of the flow of the air to be sampled.

Figure 6:
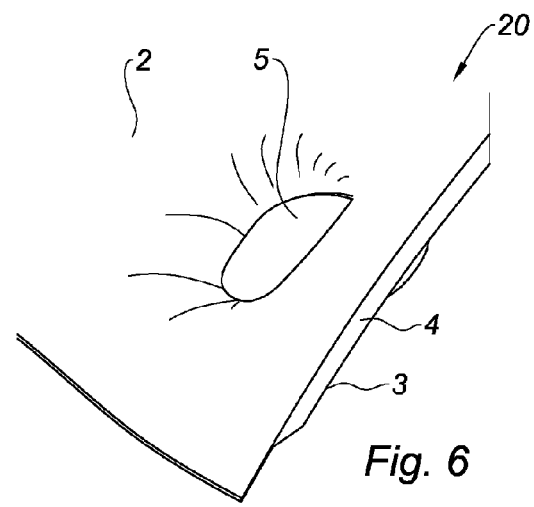
FIGS. 6 and 7 are respectively top and bottom view schematic representations of a composite panel according to the present disclosure comprising a sampling scoop integrated into the panel and fully formed from said panel.
Figure 7:
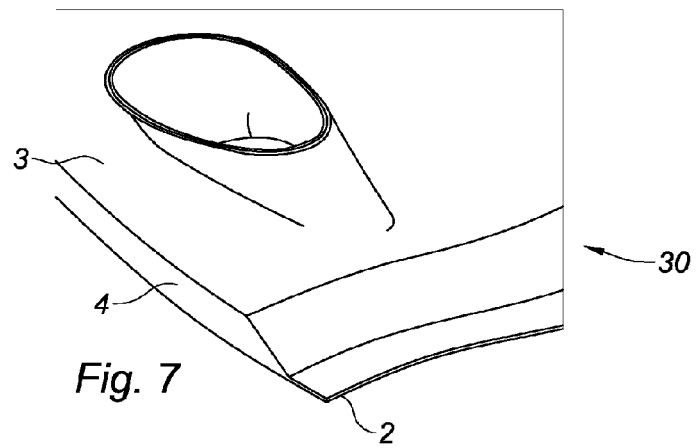

FIGS. 6 and 7 show a composite panel 30 wherein the scoop structure is fully made from the outer 2 and inner 3 skins of the panel 30 which are joined to form the duct of the sampling scoop.

Thus, the scoop is integrated into the panel and the flow surface is aerodynamically optimal.

Figure 8:
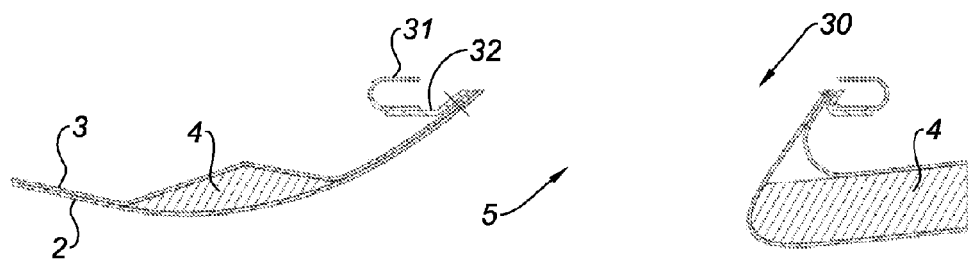
FIG. 8 is a cross-sectional schematic representation of the panel of FIGS. 6 and 7.

FIG. 8 shows more specifically the panel structure 30. We will notice that the duct formed by the scoop is equipped with a peripheral seal 31 supported by a fixing clamp 32 fixed in the inner 2 and outer 3 skins of the panel 30.

Although the present disclosure has been described with a particular example of the form, it is, of course, in no way limited and comprises all technical equivalents of the means described as well as their combinations if they fall within the scope of the present disclosure.

What is claimed is:

1. A composite sandwich panel of a structure of a turbojet engine nacelle comprising a core surrounded by an inner skin and an outer skin, the core and the inner and outer skins defining a thickness of the composite sandwich panel, the composite sandwich panel having at least one air flow duct, the inner skin and outer skin being joined together around a periphery of the duct, and the duct extending through the inner skin and the outer skin, wherein the air flow duct is integrated into the composite sandwich panel and said outer skin is shaped so as to form at least a portion of an inlet surface of the air flow duct, wherein the outer skin forming the inlet surface is curved past the thickness of the composite panel such that the inlet surface exceeds the thickness of the composite panel.

2. The composite sandwich panel according to claim 1, wherein the outer skin forming the inlet surface of the air flow duct is formed by pressing and bending the outer skin.

3. The composite sandwich panel according to claim 1, wherein the inlet surface formed by the outer skin extends over an entire periphery of the air flow duct.

4. The composite sandwich panel according to claim 3, wherein the air flow duct is fully formed from the outer skin.

5. The composite sandwich panel according to claim 3, wherein the air flow duct is fully formed from the outer skin and the inner skin.

6. The composite sandwich panel according to claim 1, wherein the air flow duct is located in an area of said composite sandwich panel comprising the core.

7. The composite sandwich panel according to claim 1, wherein the air flow duct is located in a monolithic area of said composite sandwich panel not comprising any core.

8. The composite sandwich panel according to claim 1, wherein the air flow duct comprises a collar added to the inner skin of said composite sandwich panel.

* * * * *